United States Patent
Whalley et al.

(10) Patent No.: US 9,558,363 B2
(45) Date of Patent: Jan. 31, 2017

(54) SYSTEMS AND METHODS OF CONTEXT BASED DATA ACCESS CONTROL OF ENCRYPTED FILES

(71) Applicant: Apple Inc., Cupertino, CA (US)

(72) Inventors: Andrew Roger Whalley, San Francisco, CA (US); Wade Benson, San Jose, CA (US); Conrad Sauerwald, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 70 days.

(21) Appl. No.: 14/503,244

(22) Filed: Sep. 30, 2014

(65) Prior Publication Data

US 2015/0347770 A1 Dec. 3, 2015

Related U.S. Application Data

(60) Provisional application No. 62/005,943, filed on May 30, 2014.

(51) Int. Cl.
*G06F 21/00* (2013.01)
*G06F 21/62* (2013.01)

(52) U.S. Cl.
CPC ....... *G06F 21/6209* (2013.01); *G06F 21/6245* (2013.01); *G06F 21/6218* (2013.01); *G06F 2221/2111* (2013.01)

(58) Field of Classification Search
CPC ..... G06F 21/6209; G06F 21/10; H04W 12/12; H04L 9/0838; H04L 63/20

(Continued)

(56) References Cited

U.S. PATENT DOCUMENTS 7,542,569 B1 * 6/2009 Leiwo ................. H04L 63/0428
                                                    380/247
8,495,700 B2 * 7/2013 Shahbazi ................ H04L 63/20
                                                    380/247

(Continued)

FOREIGN PATENT DOCUMENTS

JP      2009-230178     10/2009
JP      2010-244432     10/2010

(Continued)

OTHER PUBLICATIONS

Lily Chen et al., "Guidelines on Hardware Rooted Security in Mobile Devices (Draft): Recommendations of the National Institute of Standards and Technology," Oct. 31, 2012, Retrieved from the Internet:URL:http:jjcsrc.nist.govjpublications/drafts/888-164fsp888 164draft.pdf [retrieved on Sep. 28, 2015], pp. 1-34.

*Primary Examiner* — Hadi Armouche
*Assistant Examiner* — Bryan Wright
(74) *Attorney, Agent, or Firm* — Blakely, Sokoloff, Taylor & Zafman LLP

(57) ABSTRACT

In some implementations, encrypted data (e.g., application data, keychain data, stored passwords, etc.) stored on a mobile device can be accessed (e.g., decrypted, made available) based on the context of the mobile device. The context can include the current device state (e.g., locked, unlocked, after first unlock, etc.). The context can include the current device settings (e.g., passcode enabled/disabled). The context can include data that has been received by the mobile device (e.g., fingerprint scan, passcode entered, location information, encryption key received, time information).

21 Claims, 6 Drawing Sheets

(58) Field of Classification Search
USPC .......................................................... 726/30
See application file for complete search history.

(56) References Cited

U.S. PATENT DOCUMENTS

| | | | | |
|---|---|---|---|---|
| 8,645,687 | B2* | 2/2014 | Taylor | G06F 21/10 380/281 |
| 8,707,034 | B1 | 4/2014 | Ryan | |
| 8,948,398 | B2* | 2/2015 | Robert | G06F 21/10 380/239 |
| 8,974,544 | B2* | 3/2015 | Hubner | G06F 21/31 709/221 |
| 2008/0147831 | A1* | 6/2008 | Redjaian | G06F 21/57 709/222 |
| 2008/0229428 | A1* | 9/2008 | Camiel | G06F 17/30082 726/27 |
| 2009/0249497 | A1* | 10/2009 | Fitzgerald | H04W 12/12 726/35 |
| 2010/0094654 | A1* | 4/2010 | Stewart | G06F 19/323 705/3 |
| 2011/0058675 | A1* | 3/2011 | Brueck | H04N 21/2541 380/277 |
| 2011/0252234 | A1* | 10/2011 | De Atley | H04L 9/0891 713/165 |
| 2011/0252243 | A1* | 10/2011 | Brouwer | H04L 9/0838 713/189 |
| 2012/0284534 | A1* | 11/2012 | Yang | G06F 21/77 713/193 |
| 2013/0034229 | A1 | 2/2013 | Sauerwald et al. | |
| 2014/0007260 | A1* | 1/2014 | Du | G06F 21/6209 726/28 |

FOREIGN PATENT DOCUMENTS

| | | |
|---|---|---|
| KR | 10-2014-0003599 | 1/2014 |
| WO | 2012/129002 | 9/2012 |
| WO | 2014/052069 | 4/2014 |

* cited by examiner

SYSTEMS AND METHODS OF CONTEXT BASED DATA ACCESS CONTROL OF ENCRYPTED FILES

CROSS-REFERENCE TO RELATED APPLICATIONS

This application claims priority to U.S. Provisional Patent Application No. 62/005,943, filed on May 30, 2014, entitled "Context Based Data Access Control," the content of which is incorporated herein by reference in its entirety.

TECHNICAL FIELD

The disclosure generally relates encrypting data on a computing device.

BACKGROUND

Mobile devices are used to store and process data. Often the data stored on the mobile device includes sensitive personal information (e.g., names, addresses, credit card information, passwords, etc.) or secret enterprise information (e.g., client information, medical records, etc.). Modern mobile devices are often configured to encrypt data stored on the mobile device and make the data available only under certain conditions (e.g., when the device is unlocked, when valid password is entered, etc.).

SUMMARY

In some implementations, encrypted data (e.g., application data, keychain data, stored passwords, etc.) stored on a mobile device can be accessed (e.g., decrypted, made available) based on the context of the mobile device. The context can include the current device state (e.g., locked, unlocked, after first unlock, etc.). The context can include the current device settings (e.g., passcode enabled/disabled, strength of password, etc.). The context can include data that has been received by the mobile device (e.g., fingerprint scan, passcode entered, location information, encryption key received, time information).

Particular implementations provide at least the following advantages: Context based access control can allow for greater flexibility when specifying when sensitive data stored on a mobile device can be accessed. Context based access control can ensure that sensitive data is accessed at an approved time, an approved place and by an approved person. Context based access control can improve the user experience by making access to sensitive data easier.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
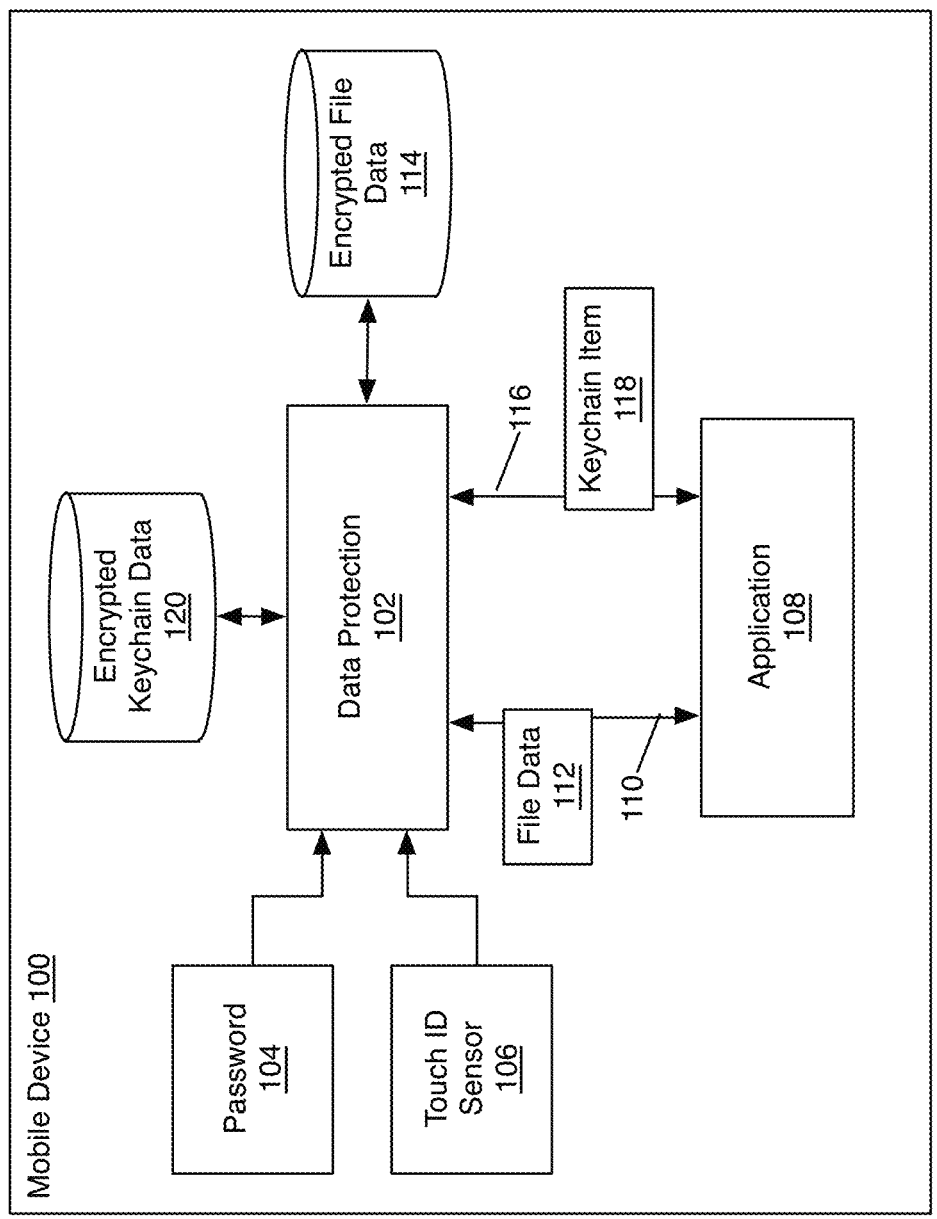
FIG. 1 is a block diagram of an example mobile device that is configured to encrypt and decrypt data written to storage on the mobile device.

FIG. 1 is a block diagram of an example mobile device 100 that is configured to encrypt and decrypt data written to storage on the mobile device 100. In some implementations, mobile device 100 can be configured with a data protection module 102. For example, data protection module 102 can be a software module that is executed by a dedicated security coprocessor that is fabricated on a chipset of mobile device 100. The security coprocessor is separate from the application processor and handles all encryption/decryption and security features of mobile device 100, for example. The security coprocessor utilizes its own secure boot and personalized software update separate from the application processor. It also provides all cryptographic operations for data protection key management and maintains the integrity of data protection even if the kernel has been compromised.

In some implementations, the security coprocessor uses encrypted memory and includes a hardware random number generator. Communications between the security coprocessor and the application processor is isolated to an interrupt-driven mailbox and shared memory data buffers. In some implementations, the security coprocessor is provisioned during fabrication with its own unique identifier (UID) that is not accessible to other parts of the system. When the device starts up, an ephemeral key is created, combined with the UID, and used to encrypt the security coprocessor's portion of the memory space of mobile device 100. Additionally, data saved to the file system of mobile device 100 by the security coprocessor is encrypted with a key (e.g., passcode, password 104) combined with the UID.

In some implementations, the security coprocessor is responsible for processing fingerprint data from touch identification sensor 106. For example, touch ID sensor 106 can receive (e.g., scan) a fingerprint and the security coprocessor can determine if there is a match against registered fingerprints. When the security coprocessor determines that the fingerprint matches one of the registered fingerprints, the security coprocessor can enable access to mobile device 100, application data stored on mobile device 100 and/or keychain data (e.g., stored passwords, user information, etc.) stored on mobile device 100. Communication between touch ID sensor 106 and the security coprocessor is configured so that the chipset and application processor cannot access the touch ID sensor data.

In some implementations, the security coprocessor can directly access other components of mobile device 100 to obtain data needed for access control and/or encryption operations. For example, the security coprocessor can directly access location processors (e.g., GPS) and the system clock so that location data and/or time data cannot be spoofed by other applications and/or processes running on mobile device 100.

In some implementations, data protection module 102 can protect data (e.g., application data, keychain data, etc.) on mobile device 100 by constructing and managing a hierarchy of encryption keys. Data protection module 102 can protect data on a per-file (or per-keychain item) basis by assigning each file to a data protection class. For example, data protection module 102 can control accessibility by locking and unlocking (encrypting and decrypting) data protection class keys that are used to encrypt each file.

In some implementations, mobile device 100 can include application 108. For example, application 108 can generate data that needs to be stored in data storage (e.g., memory, hard disk, flash memory, etc.) on mobile device 100. Application 108 can send a write request 110 that includes the data (e.g., file data 112) to data protection module 102. When sending the write request 110, application 108 can specify a data protection class for file data 112. For example, the data protection class can be associated with policies that control when a file can be accessed or decrypted.

In some implementations, upon receiving the write request 110, data protection module 102 can encrypt the file data 112 with a class encryption key corresponding to the specified data protection class and write the encrypted file data 112 to encrypted file data store 114. For example, file data 112 can be encrypted using encryption keys generated by the security coprocessor described above. In some implementations, the keys can be generated by a random number generator (e.g., the hardware random number generator described above). In some implementations, the keys can be generated based on password 104 and/or the security coprocessor UID.

In some implementations, application 108 can store or access encrypted keychain data on mobile device 100. For example, encrypted keychain data (e.g., passwords, credit card information, user identification information, etc.) can be stored in a database 120. Each entry or item in database 120 can be individually encrypted using a per-item key. Each item can be associated with a data protection class that specifies policies that control when an item can be accessed or decrypted. For example, application 108 can send a write request 116 including keychain item 118 to data protection module 102. The write request 116 can specify a data protection class for keychain item 118, for example. In response to receiving the keychain write request 116, data protection module 102 can encrypt the keychain item 118 using an encryption key associated with the data protection class and store the encrypted keychain item 118 in encrypted keychain database 120.

In some implementations, data protection module 102 will not write the keychain item or data file when an invalid data protection class is specified in the write request. For example, if the specified data protection class is associated with a policy that requires a password to be enabled and set on mobile device 100 and mobile device 100 is not password protected, data protection module 102 will not encrypt and write the keychain item or the file data to the encrypted keychain database 120 or the encrypted file data store 114. Instead, data protection module 102 will return an error to application 108 indicating that an invalid data protection class was specified for the write operation.

Although the paragraphs that follow describe context based access control mechanisms in terms of files, file contents, file metadata, etc., similar mechanisms can be used to protect keychain data, keychain items, keychain metadata and the like. For example, each keychain item (entry) in the keychain database can be treated and protected using the same context based access control mechanism described for individual files below. Although keychain items and files are different (e.g., an entry in a database vs. an individual file), the encryption key hierarchies, encryption mechanisms, and/or context based access control mechanism described below can be used to provide access control for both keychain items and individual files.

Figure 2:
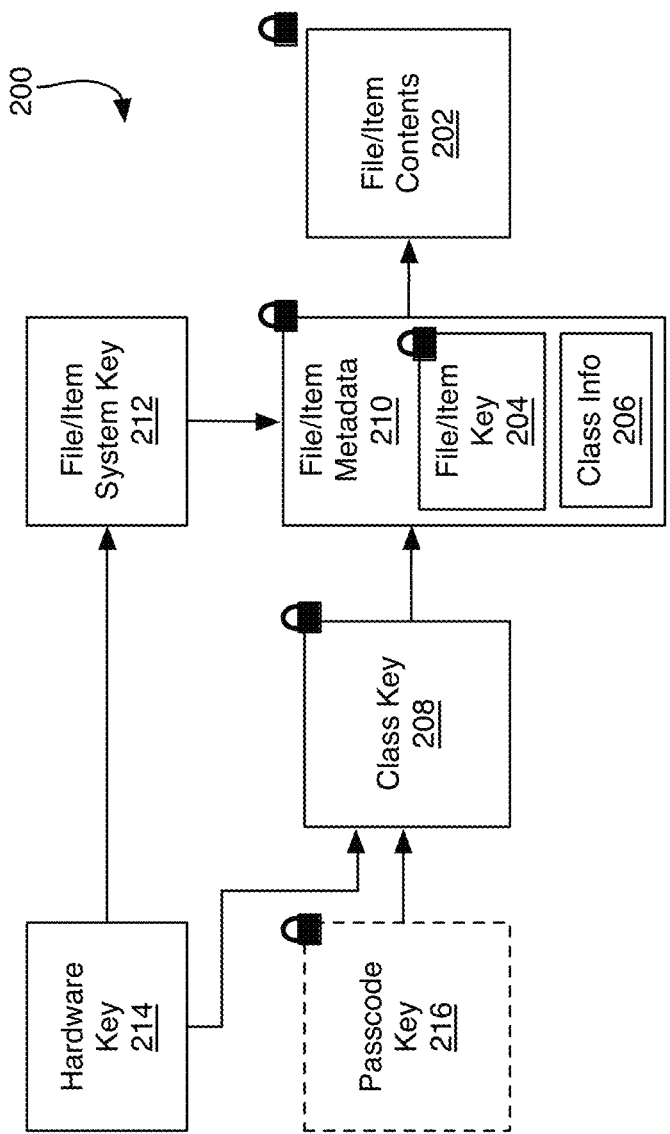
FIG. 2 is a block diagram illustrating an example encryption key hierarchy for performing context based data access control on a mobile device.

FIG. 2 is a block diagram 200 illustrating an example encryption key hierarchy for performing context based data access control on a mobile device. For example, a file (or keychain item) 202 can be encrypted using a per-file (or per-item) key 204. The file key 204 can be generated by data protection module 102 (e.g., using the security coprocessor).

In some implementations, file metadata 210 can include class information 206. For example, class information 206 can include information that identifies the data protection class specified for the file contents 202. The data protection class can be specified by the application associated with the file contents or keychain item 202, as described above.

In some implementations, file key 204 can be encrypted using class key 208. For example, a data protection class can have a corresponding class key 208 that is used to encrypt the file key 204 for file contents 202 associated with the data protection class. The class key 208 can be accessed, deleted, etc., according to policies associated with the data protection class, as described further below. Thus, the file contents 202 can only be accessed when the data protection class policies associated with the file contents 202 are satisfied. The encrypted file key 204 can be stored in file metadata 210.

In some implementations, file metadata 210 can be encrypted using a file system key 212. For example, the file system key 212 can be generated based on a device hardware key (e.g., security coprocessor UID, device identifier, etc.). The file system key 212 ensures that the file metadata 210 and file contents 202 can only be accessed by the mobile device corresponding to hardware key 214.

In some implementations, file system key 212 can be deleted to render all data on the mobile device inaccessible. For example, data protection module 102 can delete file system key 212 from the memory or disk of mobile device 100 to prevent decrypting the encrypted file metadata 210 thereby preventing access to file key 204 and file contents 202. For example, a user can provide input to wipe all data from mobile device 100. In response to the user input, data protection module 102 can delete file system key 212 to make all data inaccessible (e.g., the system cannot decrypt files without the system data key 212).

In some implementations, class key 208 can be encrypted using hardware key 214. For example, if passcode protection is disabled on mobile device 100 (e.g., no passcode/password is required to access mobile device 100), then the class key 208 can be encrypted using only hardware key 214. If passcode protection is enabled, then class key 208 can be encrypted using a combination (e.g., concatenation, hash, etc.) of hardware key 214 and passcode key 216. For example, passcode key can be received by user input (e.g., typing the passcode as input to mobile device 100) when the user unlocks mobile device 100 for use. When the mobile device 100 is locked (e.g., automatically after a period of inactivity, manually in response to user input), the passcode key can be deleted.

In some implementations, biometric user data can be used to unlock mobile device 100 and decrypt data stored on mobile device 100. For example, mobile device 100 can be configured to receive fingerprint data from a user of mobile device 100. The user can place a finger on a fingerprint scanner of mobile device 100. The fingerprint scanner can capture an image of the fingerprint of the finger. The fingerprint can be sent from the scanner to the data protection module 102. Data protection module 102 can validate the fingerprint by determining that the fingerprint corresponds to a registered fingerprint of an authenticated (e.g., by passcode, password) user of the mobile device.

If fingerprint access (e.g., touch ID) is enabled, data protection module will store the passcode key 216 for a period of time. For example, the passcode key 216 will not be deleted when the device is locked. Instead, the passcode key or equivalent will be made unavailable for use until a valid fingerprint has been captured by mobile device 100.

Figure 3:
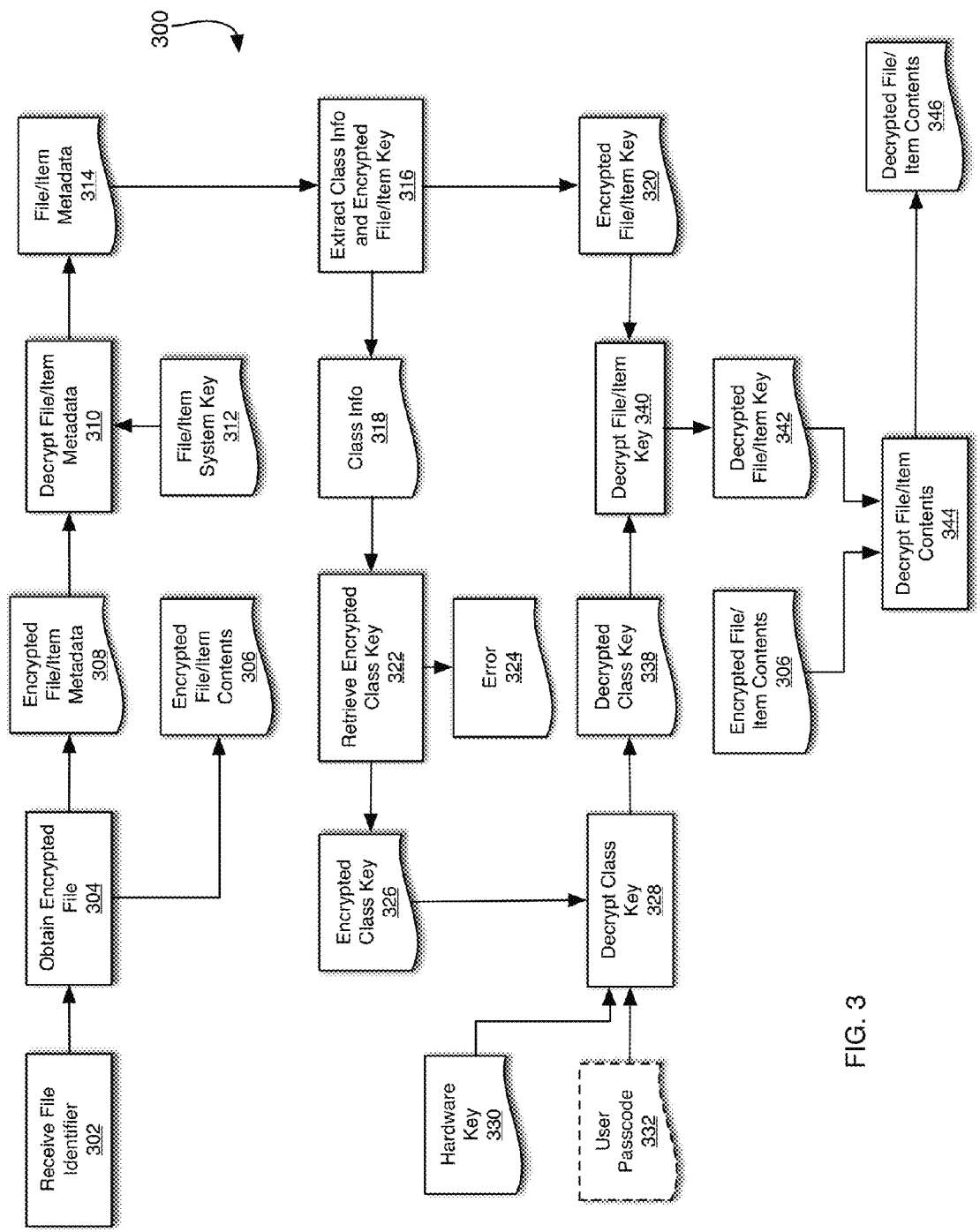
FIG. 3 illustrates an example process for decrypting a file using context based data access control and the encryption key hierarchy of FIG. 2.

FIG. 3 illustrates an example process 300 for decrypting a file using context based data access control and the encryption key hierarchy of FIG. 2. At step 302, data protection module 102 can receive a file read request that includes a file identifier. For example, the file identifier can correspond to a file that has previously been encrypted by data protection module 102. At step 304, data protection module 102 can use the file identifier to obtain the encrypted file contents 306 and encrypted file metadata 308. For example, the requested encrypted file contents 306 can be associated with encrypted file metadata 308 that includes a file key and information that identifies the data protection class associated with the encrypted file.

At step 310, data protection module 102 can decrypt the encrypted file metadata 308. For example, the encrypted file metadata 308 can be decrypted using the file system key 312 to generate decrypted file metadata 314. At step 316, data protection module 102 can extract the data protection class information 318 and the encrypted file key 320 from the decrypted file metadata 314.

At step 322, the data protection module 102 can retrieve the encrypted class key. For example, the data protection module 102 can use the class information 318 to identify the data protection class associated with the requested file. Once the data protection class is identified, the data protection module can obtain the data protection policies associated with the class. If the current state or context of the mobile device 100 does not satisfy the rules specified by the data protection policies (described further below), then the data protection module will return an error 324 in response to the file request. If the encrypted class key has been deleted or is otherwise unavailable, the data protection module 102 will return an error 324 in response to the file request. If the current state or context of the mobile device 100 satisfies the rules specified by the data protection policies (as described further below), then the data protection module can retrieve or obtain the encrypted class key 328 associated with the data protection class.

At step 328, the data protection module 102 can decrypt the encrypted class key 326. For example, the encrypted class key can be encrypted using hardware key 330 (e.g., hardware key 214 of FIG. 2) and/or user passcode 332 (e.g., passcode key 216 of FIG. 2). For example, mobile device 100 can be configured without a user passcode and the encrypted class key can be encrypted/decrypted using only the hardware key 330. Alternatively, mobile device 100 can be configured with a user passcode 332 and the encrypted class key can be encrypted/decrypted using a combination (e.g., concatenation, hash, etc.) of the hardware key 330 and the user passcode 322. For example, the user can enable and/or disable password protection on mobile device 100.

In some implementations, the user can enable biometric access to mobile device 100. For example, the user can enable fingerprint authentication on mobile device 100. Once fingerprint authentication is enabled, the user can touch a touch identification sensor of mobile device 100, the touch identification sensor can scan the finger of the user to obtain a fingerprint, the fingerprint can then be used to determine if the user is an authorized user of mobile device 100. If fingerprint authentication is enabled, the mobile device 100 will encrypt and store the user's passcode or a key derived from it. For example, if fingerprint authentication is disabled and passcode protection is enabled, the user must enter the passcode to unlock mobile device 100 because each time that the device is locked the user's passcode is deleted from the mobile device 100. If fingerprint authentication is enabled, the data protection module 102 will store the user's passcode, or a key derived from it and use the user's fingerprint to authorize use of the passcode or key At step 340, the encrypted file key 320 can be decrypted using the decrypted class key 338 to generate decrypted file key 342. For example, the encrypted file key 320 can be extracted from the file metadata 314 at step 316, as described above. The decrypted file key 342 can be used to decrypt the encrypted file contents 306 at step 344 thereby allowing access to decrypted file contents 346. The decrypted file contents 346 can then be returned to the process that requested the file at step 302.

In some implementations, decrypted data can be deleted after it is used in process 300. For example, decrypted metadata 314, decrypted class key 338, decrypted file key 342 and decrypted passcode 332 can be deleted once they are used to decrypt encrypted file contents 306.

Figure 4:
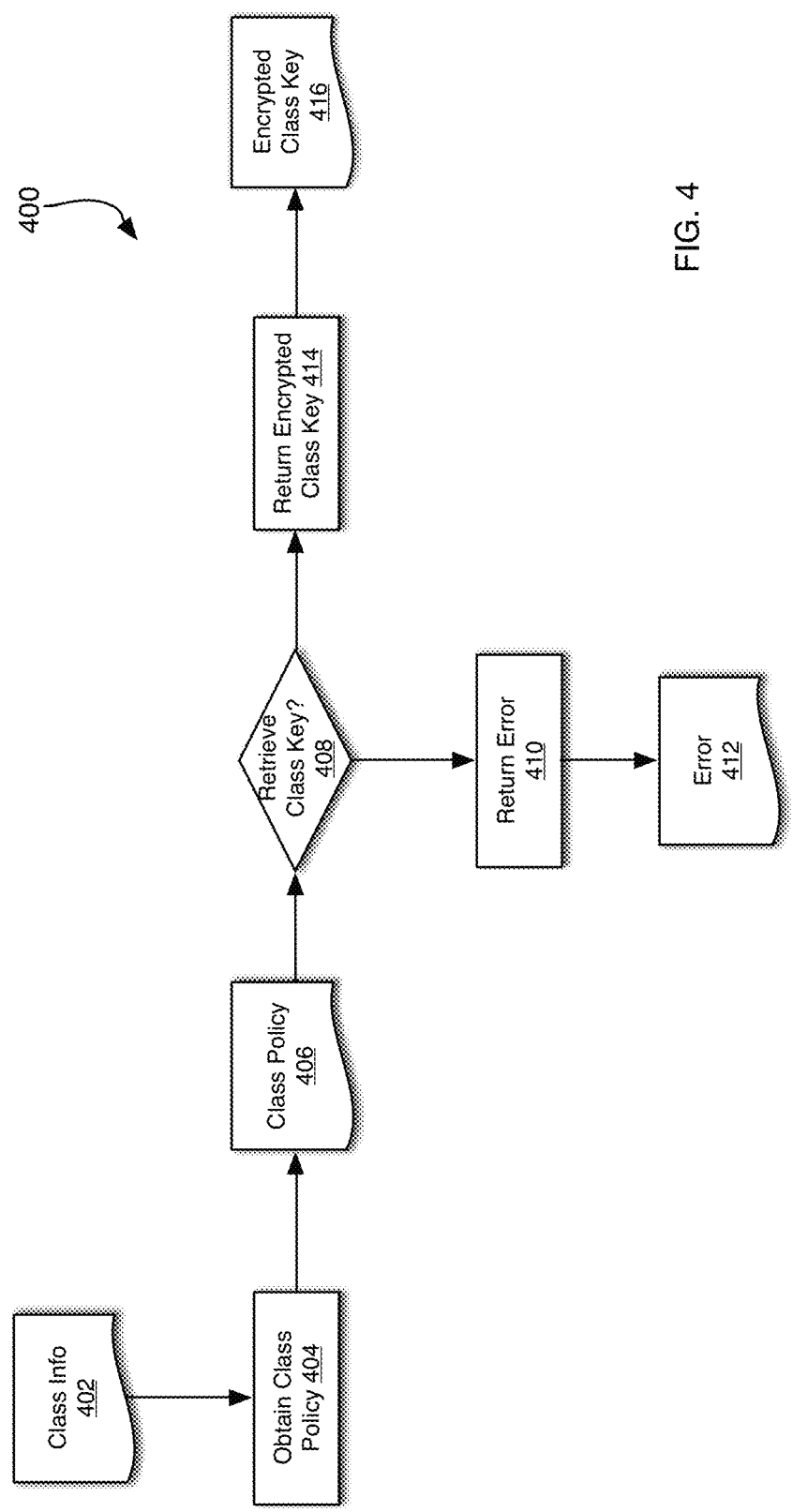
FIG. 4 illustrates an example process for retrieving a class key based on data protection class policies.

FIG. 4 illustrates an example process 400 for retrieving a class key based on data protection class policies. For example, process 400 can be performed at step 322 of FIG. 3. At step 404, class information 402 (e.g., class information 318 of FIG. 3) can be used to obtain class policies 406 for the data protection class identified by class information 402. For example, the policies for each data protection class can be stored in a database managed by data protection module 102 on mobile device 100. The data protection class policies can specify rules that dictate when a data protection class key should be made available for decrypting a file or keychain item (entry) protected by the data protection class.

In some implementations, the class policies can specify that files or keychain items protected by the data protection class should always be decrypted on the mobile device. For example, under this policy the data protection class key can always be made available for decrypting files or keychain items. Moreover, the class key will only be encrypted using the hardware key 330. The class key will not be encrypted using the user passcode 332 because the file or keychain item should always be available to the processes running on mobile device 100.

In some implementations, the class policies can specify that files or keychain items protected by the data protection class should only be decrypted when the device is unlocked, and these policies can be enforced cryptographically. For example, under this policy the class key will only be made available when the user has entered a passcode. Additionally, the class key will be encrypted using both the hardware key 330 and the user passcode 332. Since the user passcode 332 is only available (e.g., resident on mobile device 100 or decrypted) on mobile device 100 when the passcode is entered or a fingerprint provided to unlock the mobile device, files or keychain items protected under this policy will only be decrypted when the user unlocks the device by entering a passcode or providing a fingerprint.

In some implementations, the class policies can specify that files or keychain items protected by the data protection class should only be decrypted after the device is unlocked the first time after a reboot. For example, under this policy data protection module 102 will store a class key derived from the user's passcode the first time the user unlocks mobile device 100. The class key will be encrypted/decrypted using both hardware key 330 and user passcode 332. The data protection module 102 will make the class key available after the first time the user unlocks the mobile device 100 after a reboot or restart.

In some implementations, the class policies can specify that files or keychain items protected by the data protection class should only be decrypted when a passcode is enabled on the mobile device. For example, a user can select to enable or disable passcode data protection on mobile device 100. Some applications and processes may depend on data protection to protect sensitive data (e.g., sensitive user data, medical records, etc.). The applications can check with mobile device 100 to determine if a passcode is enabled on mobile device but the application will be unable to monitor whether passcode protection has been enabled or disabled when the application is not running (e.g., executing) on the mobile device 100. Under this policy, data protection module will only make the class key available when a passcode is enabled on the mobile device. If passcode protection is disabled on the mobile device 100, data protection module will prevent access to the class key thereby preventing decryption of the encrypted file or keychain item when passcode protection is disabled.

In some implementations, the class policies can specify that files or keychain items protected by the data protection class should only be decrypted when a passcode is enabled on the mobile device and when the passcode exceeds a specified strength. For example, a user can select to enable or disable passcode data protection on mobile device 100. Some applications and processes may depend on data protection to protect sensitive data (e.g., sensitive user data, medical records, etc.). The applications can check with mobile device 100 to determine if a passcode is enabled on mobile device and that the strength of the passcode exceeds a specified strength (e.g., based on passcode complexity, characters used, length, etc.) but the application will be unable to monitor whether passcode protection has been enabled or disabled when the application is not running (e.g., executing) on the mobile device 100. Under this policy, data protection module will only make the class key available when a passcode is enabled on the mobile device and when the strength of the passcode is greater than the strength specified by the policy. If passcode protection is disabled on the mobile device 100 or if the passcode is not strong enough, data protection module 102 will prevent access to the class key thereby preventing decryption of the encrypted file when passcode protection is disabled or when the passcode is too weak.

In some implementations, the class policies can specify that files or keychain items protected by the data protection class should only be decrypted when the mobile device is at a specified location. For example, the location can be specified as a particular location, within a specified distance of a particular location, or within a specified geofenced area. When the mobile device is at or near the specified location, data protection module 102 can make the data protection class key available for decrypting a file or keychain item protected by a class associated with this location policy. When the mobile device 100 is not at or near the specified location, data protection module 102 can make the data protection class key unavailable for decrypting a file or keychain item protected by a class associated with this location policy.

In some implementations, the class policies can specify that files or keychain items protected by the data protection class should only be decrypted when a specified user fingerprint is scanned by the mobile device. For example, a user can configure one or more fingers (e.g., thumb, index, middle, ring, pinky) for fingerprint authentication. The user can specify that certain fingers will unlock, decrypt or provide access to specified keychain items or files. For example, the user can specify that a thumb fingerprint will unlock files on the mobile device 100. The user can specify that an index fingerprint will allow access to a password item in the keychain database. The user can specify that a pinky fingerprint will allow access to a credit card item in the keychain database. Thus, when a keychain entry or a file is encrypted and associated with a data protection class that has an index fingerprint policy, data protection module 102 will only allow access to the class key when the user has provided an index finger fingerprint to mobile device 100.

In some implementations, the class policies can specify that files or keychain items protected by the data protection class should only be decrypted when the class key is downloaded from a server. For example, the class policy can identify (e.g., by URL, IP address, etc.) a server from which to download the class key. When decryption of a file protected by this data protection policy is requested, the data protection module 102 can attempt to contact the server and download the class key. If the key is downloaded, the file can be decrypted. If the key is not downloaded, the file will not be decrypted. This data protection class policy allows others (e.g., an employer, an enterprise, etc.) to control access to information stored on a user's device. For example, an employer can prevent the user's mobile device from accessing the class key stored in the server and thereby prevent the mobile device from decrypting files (e.g., proprietary business files) owned by the employer.

In some implementations, the class policies can specify that files or keychain items protected by the data protection class should only be decrypted during a specified period of time. For example, the policy can specify that a file or keychain item can only be accessed on specified days of the week (e.g., Monday-Friday). The policy can specify that a file or keychain item can only be accessed between specified hours (e.g., 9 am-6 pm). When a user or application attempts to access the encrypted file or keychain item during the specified time period, data protection module 102 will allow access to the class key and the file or keychain item can be decrypted. When a user or application attempts to access the encrypted file or keychain item outside of the specified time period, data protection module 102 will prevent access to the class key and the file or keychain item will not be decrypted.

At decision 408, the data protection module 102 can determine whether the class key (e.g., encrypted class key 326 of FIG. 3) should be made available for decrypting the file or keychain item. For example, data protection module 102 can determine that each of the policies specified for the data protection class is satisfied. If one of the policies (e.g., rules) associated with the data protection class is not satisfied, data protection module 102 can return an error 412 at step 410 to prevent access to the encrypted class key. If all of the policies associated with the data protection class are satisfied, then data protection module 102 can return the encrypted class key 416 at step 414. The encrypted class key 416 (e.g., encrypted class key 326) can then be decrypted by process 300 at step 328, as described above.

In some implementations, the encrypted class key can be deleted from mobile device when data protection module 102 determines that a policy associated with the class key is not satisfied. For example, a data protection class policy can specify that a file or keychain item can only be accessed at a work location. Upon detecting that the mobile device 100 has left the work location, data protection module 102 can delete the class key associated with the data protection class that includes the work location policy thereby preventing access to the file or keychain item protected by the work location policy.

Figure 5:
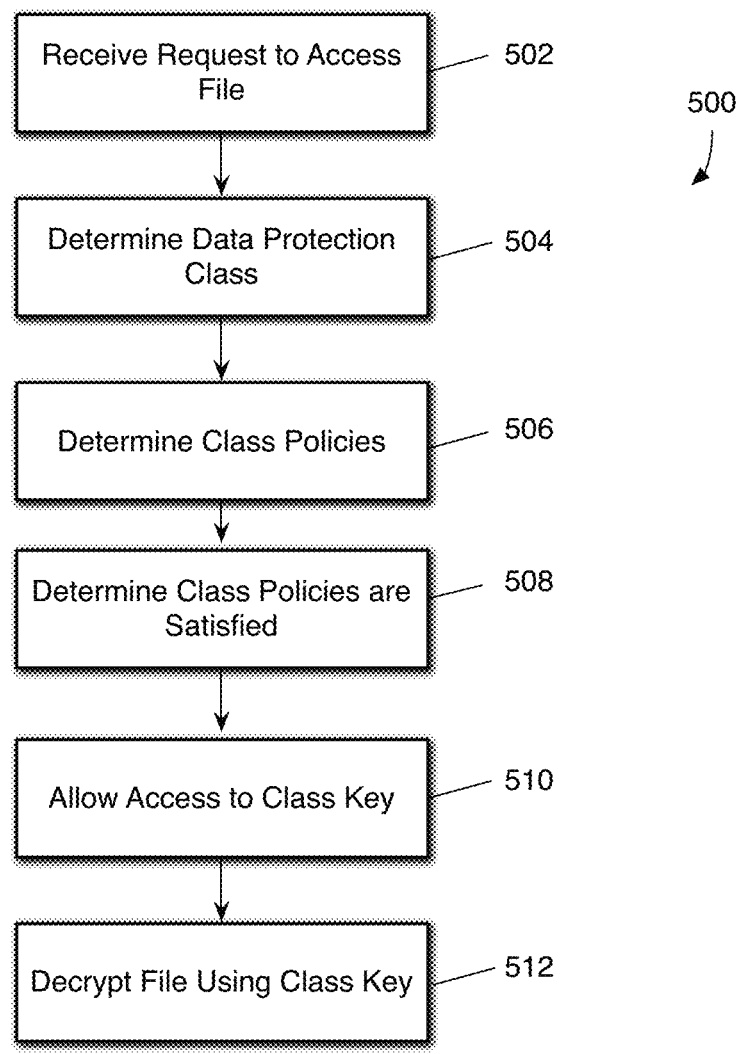
FIG. 5 is flow diagram of an example process for context based access control.

FIG. 5 is flow diagram of an example process 500 for context based access control. For example, data protection class policies can enable access or disable access to encrypted files and/or encrypted keychain items stored on a mobile device based on the context (e.g., location, time of day, network access, configuration, etc.) of the mobile device.

At step 502, the data protection module can receive a request to access an encrypted file. For example, an application can request access to a file encrypted on mobile device 100.

At step 504, the data protection module can determine the data protection class associated with the requested encrypted file. For example, the data protection module can obtain data protection class information from metadata associated with the encrypted file.

At step 506, the data protection module can determine policies associated with the data protection class. For example, the policies can specify one or more mobile device contexts (e.g., device state, device configuration, device location, current time of day, network access, etc.) during which the requested file can or cannot be accessed (e.g., decrypted).

At step 508, the data protection module can determine whether the data protection class policies are satisfied. For example, data protection module can obtain context information, such as the current device state, the current device settings, location data (e.g., GPS data, access point data, cellular data, etc.) for the device, the current time of day, and network connectivity information (e.g., connected to enterprise server). The data protection module can compare the context information to the class policy requirements to determine if the class policies are satisfied (e.g., the requirements for allowing access to the encrypted file are met). Different weight can be given to the context information depending if it comes from a trusted source or not.

At step 510, the data protection module can allow access to the class key corresponding to the determined data protection class. For example, if the class policies are satisfied, then the class key will be made available for decrypting the requested file.

At step 512, the data protection module can decrypt the requested file using the class key. For example, the data protection module can decrypt the requested file and return the decrypted file to the requesting application.

Example System Architecture

Figure 6:
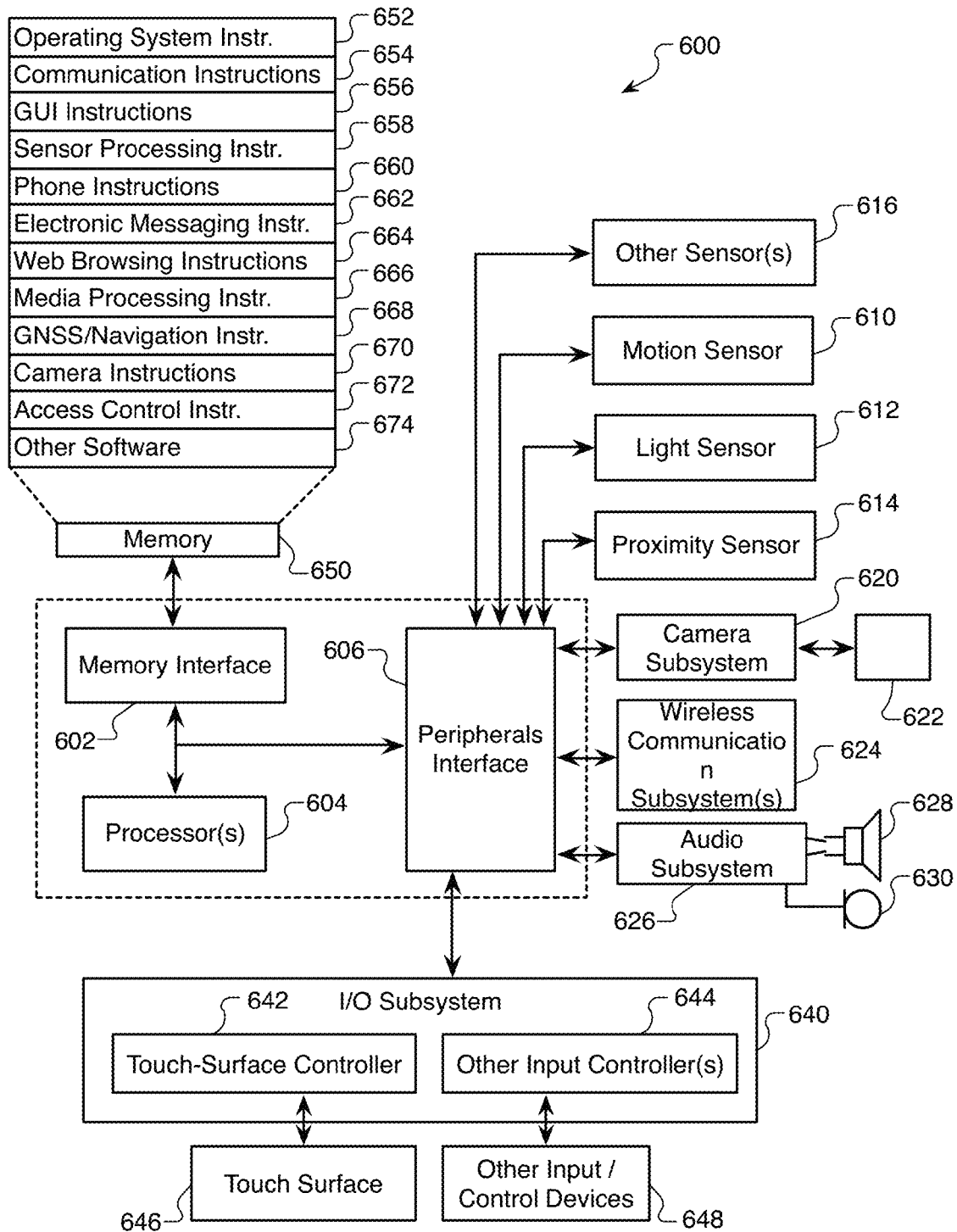
FIG. 6 is a block diagram of an example computing device that can implement the features and processes of FIGS. 1-5.

FIG. 6 is a block diagram of an example computing device 600 that can implement the features and processes of FIGS. 1-5. The computing device 600 can include a memory interface 602, one or more data processors, image processors, security coprocessors, application processors, and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, magnetometer or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device 100 can be configured as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voiceprinting and voice authentication, for example.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™. The computing device 600 can, therefore, include a 36-pin connector that is compatible with the iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). Memory 650 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement the context based access control features as described with reference to FIGS. 1-5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store software instructions 672 to facilitate other processes and functions described above, such as the context based access control processes and functions as described with reference to FIGS. 1-5.

The memory 650 can also store other software instructions 674, such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of controlling access to an encrypted file stored on a mobile device, comprising:
   receiving, by the mobile device, a request for access to an encrypted file, the encrypted file including encrypted file content which is associated with encrypted file metadata;
   decrypting the encrypted file metadata, wherein the decryption is performed using a key derived by the mobile device;
   determining, by the mobile device, an encrypted file content key and data protection class information;
   retrieving, using the data protection class information, an encrypted class key and a policy associated with the data protection class and the encrypted file content, the policy specifying a required context comprising a state or configuration of the mobile device for enabling access to the encrypted file content, and the class key, when decrypted, enables decryption of the encrypted file content key;
   determining a current context of the mobile device;
   comparing the current context to the required context;
   enabling access to the encrypted file content when the current context corresponds to the required context.

2. The method of claim 1, wherein the required context comprises one of:
   the mobile device is configured to enable decryption of the class key without a user entering a passcode; or
   the mobile device is configured to require entry of a passcode or a fingerprint scan to enable decryption of the class key.

3. The method of claim 1, wherein the required context includes a requirement that password protection is enabled for the mobile device.

4. The method of claim 1, wherein the required context includes a requirement that a strength of a password configured for the mobile device is greater than a threshold strength.

5. The method of claim 1, wherein the required context includes a requirement that an encryption key is downloaded from a server over a network connection.

6. The method of claim 1, wherein the required context includes a requirement that the mobile device is near a specified location.

7. The method of claim 1, wherein wherein the encrypted class key is deleted when the current context does not correspond to the required context.

8. A non-transitory computer-readable medium including one or more sequences of instructions which, when executed by one or more processors of a mobile device, causes the one or more processors to:

receive a request for access to an encrypted file, the encrypted file including encrypted file content which is associated with encrypted file metadata;

decrypt the encrypted file metadata, wherein the decryption is performed using a key derived by the mobile device;

determine an encrypted file content key and data protection class information;

retrieve, using the data protection class information, an encrypted class key and a policy associated with the data protection class and the encrypted file content, the policy specifying a required context for enabling access to the encrypted file content, and the class key, when decrypted, enables decryption of the file content key;

determine a current context of the mobile device;

compare the current context to the required context;

enable access to the encrypted file content when the current context corresponds to the required context.

9. The non-transitory computer-readable medium of claim 8, wherein the required context comprises one of:

the mobile device is configured to enable decryption of the class key without a user entering a passcode; or the mobile device is configured to require entry of a passcode or a fingerprint scan to enable decryption of the class key.

10. The non-transitory computer-readable medium of claim 8, wherein the required context includes a requirement that password protection is enabled for the mobile device.

11. The non-transitory computer-readable medium of claim 8, wherein the required context includes a requirement that a strength of a password configured for the mobile device is greater than a threshold strength.

12. The non-transitory computer-readable medium of claim 8, wherein the required context includes a requirement that an encryption key is downloaded from a server over a network connection.

13. The non-transitory computer-readable medium of claim 8, wherein the required context includes a requirement that the mobile device is near a specified location.

14. The non-transitory computer-readable medium of claim 8, wherein the encrypted class key is deleted when the current context does not correspond to the required context.

15. A system configured to control access to an encrypted file stored on a mobile device, comprising:

one or more processors; and a computer-readable medium including one or more sequences of instructions which, when executed by the one or more processors, causes the system to:

receive, by the mobile device, a request for access to an encrypted file, the encrypted file including encrypted file content which is associated with encrypted file metadata;

decrypt the encrypted file metadata, wherein the decryption is performed using a key derived by the mobile device;

determine an encrypted file content key and data protection class information;

retrieve, using the data protection class information, an encrypted class key and a policy associated with the data protection class and the encrypted file content, the policy specifying a required context comprising a state or configuration of the mobile device for enabling access to the encrypted file content, and the class key, when decrypted, enables decryption of the file content key;

determine a current context of the mobile device;

compare the current context to the required context;

enable access to the encrypted file content when the current context corresponds to the required context.

16. The system of claim 15, wherein the required context comprises one of:

the mobile device is configured to enable decryption of the class key without a user entering a passcode; or the mobile device is configured to require entry of a passcode or a fingerprint scan to enable decryption of the class key.

17. The system of claim 15, wherein the required context includes a requirement that password protection is enabled for the mobile device.

18. The system of claim 15, wherein the required context includes a requirement that a strength of a password configured for the mobile device is greater than a threshold strength.

19. The system of claim 15, wherein the required context includes a requirement that an encryption key is downloaded from a server over a network connection.

20. The system of claim 15, wherein the required context includes a requirement that the mobile device is near a specified location.

21. The system of claim 15, wherein the encrypted class key is deleted when the current context does not correspond to the required context.

* * * * *